Patented Mar. 15, 1932

1,849,109

UNITED STATES PATENT OFFICE

EMIL E. NOVOTNY, OF LOGAN, PENNSYLVANIA, ASSIGNOR TO JOHN STOGDELL STOKES, OF SPRING VALLEY FARMS, PENNSYLVANIA

SYNTHETIC RESIN AND METHOD OF MAKING THE SAME

No Drawing.   Application filed August 21, 1926. Serial No. 130,768.

This invention relates to a specific type of synthetic resin, utilizing resorcin as the phenolic body and preferably ordinary commercial formaldehyde as the aldehyde body, although various other forms of formaldehyde may be utilized such as its hydrates, polymers, etc. This application is specifically directed to the production of fusible and preferably soluble, resinous condensation products made of resorcin and formaldehyde, said resinous products being either of the permanently fusible type which may be subsequently hardened through the use of a suitable hardening agent or may be of the potentially reactive type. In either case the products are so made that they may be kept on hand for a relatively long length of time without undergoing changes in melting point, viscosity, or fusibility when stored at ordinary room temperature, but which react very rapidly to their final, hard, set and infusible form at higher temperatures. The method of producing these products also forms a part of this application. Specifically stated, the object of the invention is the use of formaldehyde or its equivalents in less than equimolecular proportion to the resorcin used. Subsequent additions of formaldehyde or other active methylene bodies may be made, after the preliminary reaction has taken place and the product has been preferably cooled down, or the addition may be made before the primary resin or varnish is to be used.

The object of the invention is the production of resinous bodies of high strength and great reactivity, and the reaction may be carried out either at relatively high temperatures or at ordinary room temperature; thus making available synthetic resin products of many diverse uses. Although catalytic agents can be used, consisting of either a base, acid, their salts or substances yielding a base or acid, there seems to be little advantage in the use of these as the reaction can be carried out with great speed with or without these condensing agents. By being able to eliminate the use of condensing agents, the electrical properties of the synthetic resin products are very materially improved; and by making it possible to react under diverse conditions of reaction temperatures and pressures, finished products may be molded from these resins without counteracting pressures, without loss of reagents, and without the formation of bubbles, blisters and voids as in the ordinary casting process where the product is poured into suitable containers having the desired shape of the finished object and even at room temperature a final, infusible product may be formed. On the other hand, where high temperatures may be applied the per diem production from a mold can be very materially increased when compared to the present day molding operations utilizing, say, ordinary phenol. It will, therefore, be seen that it is possible to utilize molds or matrices of relatively low melting point and of relatively weak structure to form the finished strong, hard, set and infusible resinous products, and that, on the other hand, where relatively strong dies are available and where they are provided with a proper source of heat so that a high temperature may be obtained, a large per diem production will be possible.

The resins to be described cover a class of extremely high reactive products which are difficult to control at even room temperature, and it is this method of control which forms the subject matter of this application. It is directed toward the formation of potentially reactive products which may be kept or stored for a long length of time at ordinary room temperature without materially affecting their viscosity or finally their solubility and infusibility. It is very important that resins of this highly reactive character be made under such methods which will make it simple to mix these resinous products with various fillers, etc., and that the reactivity of these resins be so controlled that there will be no difficulty in properly mixing and commingling the filling materials with the resins preliminary to the final pressing or hardening operation.

Where resorcin is combined with a formaldehyde solution without a catalytic agent it goes into solution with the formaldehyde at a temperature of approximately 150° F., and upon being removed from the heating medium the reaction continues to go on until an insoluble, infusible product is reached. This reaction goes on even at ordinary room temperature so that in a matter of a few hours or days the product has been turned over to its final, insoluble form. If kept for a longer period its infusible form will be reached, and, of course, at this point the product is of no further use to the art as a molding plastic. At slightly higher temperatures the transformation goes on much more rapidly and at temperatures of, say, 150° F. the reaction will go to its final stages in less than 30 minutes. The product, therefore, where combined on the basis of one mol. resorcin to one mol. formaldehyde has very poor keeping qualities at ordinary room temperature, and therefore, except for very special purposes, would not be of use as a commercial product made up in large quantities, particularly if such product were to be subject to resale. It might be mentioned, furthermore, that the use of various modifying agents does not seem to tone down the reactivity inasmuch as the addition of alcohol as a solvent does not give a proper commercial product as its keeping qualities still are very poor and, for that matter, the reaction of an equimolecular proportion of resorcin and formaldehyde in the presence of a quantity of alcohol will not moderate the reaction as it has been found that when this reaction is carried out at the boiling point of the alcohol the product will go to its rubbery and then its infusible form in a very few minutes.

The high reactivity of the product and the possibility of eliminating the catalytic agent makes it very desirable from the standpoint of the production of various articles for the electrical trade and for various mechanical structures, etc. Its great strength makes the product very valuable for mechanical structures as, for example, cut gears and other laminated sheetlike products. In comminuted form its high reactivity makes it possible to realize a large production from a die. Its reactivity at low temperatures makes it possible to utilize the resinous product for various casting and molding operations where the molds themselves are fragile or of low melting point. For example, under certain conditions it is entirely feasible to produce a molded printing plate from a wax matrix, utilizing this resinous product as the basis of raw material of the printing plate. This is possible because the reaction can be carried on at temperatures below the melting point of the wax.

The product of this reaction is quite novel in that the water of condensation, if any is formed, does not separate from the reaction mixture, but remains in the resin possibly in a loosely bound condition or possibly as the disperse phase of a colloidal solution. In fact, even where there is a considerable amount of water present in the reaction, as for example where an aqueous solution of formaldehyde is used, all of the water does not separate out as a distinct layer. While I do not know in exactly what manner this water is held within the resin, I do know that it can be removed by any of the well known suitable methods, as for example, by distillation.

This property of the resin for holding foreign materials within itself is not limited to water, but applies also to other materials, as for example lanolin, Chinawood oil, and calcium stearate. Also it is a simple matter to introduce various plasticizing and modifying agents in order to produce a product having marked horn-like qualities which are so desirable when a product is to be machined, cut or punched while in the mold. By the introduction of suitable modifying agents products having softer modifications but still of great strength may be produced and the qualities will be retained after the product has been reacted to its final, set and hardened form. These modifying agents, which may be of a liquid, semi-solid or solid nature, may consist of various oils of a drying or non-drying nature, waxes, etc., and they may be introduced through the use of a combination of solvents or may be introduced merely in colloidal suspension.

Where the water of solution from a wet formaldehyde reaction is removed the product becomes very tough, strong, and is low in thermoplastic properties which therefore makes it very valuable for use where the finished pieces must withstand high temperatures as, for instance, for use as valve washers under high steam pressure.

These reaction products can be made either into a liquid, sludgelike or, for that matter, solid, grindable resin body, depending upon the time and the conditions under which the reaction is carried out; and the product is therefore useful for various classes of work as, for example, varnishes for impregnation or for coating various surfaces, or, as a valuable addition to be made to various pyroxylin products in order to add body and strength to pyroxylin lacquer finishes.

The varnish itself when made to react at relatively low temperatures is ideal when used as a coating for various surfaces as, for example, metal or wood, as the product will react at room temperatures to its final, hard, set and infusible form. When impregnated into various open absorbent structures such as, for example, paper and textiles, it may be reacted to its final set form at temperatures low enough so that the filler body will not be weakened in structure because of high temperature reactions. When the varnish is used in conjunction with pyroxylin products its thorough solubility, light color and transparency make it ideal as a filling and strengthening material, but the big advantage is in the fact that there is no other resinous material on the market today which will react at ordinary room temperatures to a final, hard, set and infusible form whereby the pyroxylin finishes and surfaces are very materially hardened and strengthened. As a resinous product to be used in these and other lacquers for use as a surfacing finish on automobiles and more particularly as a finish for the hoods of automobiles, the product is ideally suited as there will be no blooming or flowing of the color and the color will not bleed out as is so noticeable on hoods of automobiles finished in pyroxylin lacquers.

The hard, grindable resins, of course, are very well suited as basic products to be utilized for the purpose of making varnishes and sludges, but these products without being cut or dissolved into varnishlike liquids or fluids may be directly incorporated or impregnated with various filling bodies of an organic or inorganic nature and therefore comminuted molding powders may be made therefrom. The products may likewise be incorporated at the beaters of a paper mill so that the products will be introduced in situ therewith by any suitable method. The high reactivity of the resinous products makes the material ideal for most any sort of molded structure, but the product is most particularly ideal where structures of heavy cross section are to be made as their greater reactivity requires only a low internal temperature in order to convert all of the product to its final set form.

The regulation of this reaction has in view the step in the process whereby the product is first caused to combine with less than its molecular weight in formaldehyde, whereby a uniform product is produced with substantially all of the reacting ingredients thoroughly combined or in condition to do so. Under these conditions a product may be produced so low in formaldehyde that the resinous product will be to all intents and purposes a permanently fusible resin. A product of this kind will be secured when the ratio of formaldehyde is on the basis of one-half mol. to one mol. of resorcin. As the ratio of formaldehyde is increased the product will become more and more potentially reactive, and it will be found that by properly regulating the conditions of reaction it is possible to incorporate as high as nine-tenths mol. formaldehyde to one mol. resorcin. However, where water of solution is to be removed, where formaldehyde is used, it is best to keep the reacting ingredients somewhat close to the half molecular weight of formaldehyde, as under these conditions the water may be readily removed. It should be understood, of course, that various polymers of formaldehyde can be substituted for the formaldehyde solution and that, therefore, under these conditions the elimination of water of solution and synthetic water of reaction, should any be formed, becomes a more simple matter.

Although hydroquinone reacts more slowly and is not considered as equal to resorcin in its technical effect, it should be understood that it is considered as an equivalent for the resorcin. The various details of operation are given in a broad sense without going into lengthy detail and many examples which have actually been produced in the laboratory are not given herein in order not to make the case cumbersome, and it is therefore asked that the spirit of the invention be interpreted in as broad a measure as possible as a great many modifications and variations are possible without departing materially from the spirit of the claims.

The following examples are given illustratively in order that this application may be more clearly understood:

*Example No. 1*—This example has in view the use of only a half mol. of formaldehyde to one mol. of resorcin. Therefore, the materials are weighed out on this basis and consists of Resorcin, commercial grade_____ 50
Formaldehyde, commercial 37%_____ 18½

All parts by weight. The materials are placed in a Pyrex beaker and the beaker is placed in a water bath at 212° F. for 20 minutes. A very slow reaction ensues. After the reaction has subsided somewhat it is safe to transfer the beaker and its contents to an oil bath and subject the contents to a temperature up to 310° F. Any water remaining in the product may be readily removed by this method and an end product of any desired viscosity or hardness may be readily obtained. The product requires heating for many hours before it will go to its insoluble, infusible form. Upon the addition of suitable hardening agents such as, for example, additional amounts of dry active methylene bodies, such as the polymers of formaldehyde as for example paraformaldehyde or, for that matter, other active methylene bodies such as hexamethylenetetramin or upon the addition of furfural, furfuramid, or other aldehyde bodies, the product may be readily converted to a rapidly reactive, potentially reactive product. It is preferable, however, to add to the product a small portion of paraformaldehyde which seems to have the highest rate of reactivity and which apparently forms the strongest final end product. Any quantity of paraformaldehyde may be added to take care of the deficiency in formaldehyde at first used. When the addition of the active methylene body, such as paraformaldehyde, is on an equimolecular basis or slightly in excess thereof, maximum reactivity will be obtained. The product, however, will have long keeping qualities because of the primary reaction which seems to combine quite uniformly with all of the resorcin present although a deficiency in formaldehyde had been used. The hardening agent, of course, may be added at any time after this primary reaction and preferably after the primary resin had been cooled down to say room temperature.

*Example No. 2*—The following example is based on the use of three-quarter mol. of formaldehyde to one mol. of resorcin and the object being to produce a product which is relatively potentially reactive and one which will require no hardening agent to be added thereto. Place in a Pyrex beaker Resorcin, commercial grade_____ 50
Formaldehyde, commercial 37%_____ 28

All parts by weight. The beaker with its contents is heated in an oil bath to 260° F. The time required for this reaction is from 10 to 15 minutes. A hard resin is obtained and the water of solution and synthetic water, if any formed, is very readily eliminated. The resin is soluble in various organic solvents such as, for example, alcohol, acetone, furfural, furfur-alcohol, etc. The fusible resins, of course, are moldable even though they are not in their soluble state. The product is capable of going into infusibility and insolubility at about 320° F. when heated for a sufficient length of time. The product, however, can be speeded up in its reaction by the subsequent addition of extra methylene groups. It is preferred again to add an amount of paraformaldehyde when the reaction may be carried out at lower temperatures or for a shorter length of time at high temperatures.

*Example No. 3*—The object of this invention is to produce a product being more reactive without the use of a hardening agent and which will still permit of the removal of most of the water of solution where wet formaldehyde is used. The ratio is on the basis of nine-tenths mol. formaldehyde. Place in a Pyrex beaker Resorcin, commercial grade_____ 50
Formaldehyde, commercial grade 37%__ 33

All parts by weight. Heat beaker and contents in an oil bath to 220° F. The reaction takes place in about 10 to 15 minutes and forms a fusible but insoluble resin that is hard and grindable. The product will not produce a varnish because of its insolubility but may be incorporated with various filling materials, etc., to produce molding powders and various incorporated products. It is quite difficult to remove all of the water of solution from the formaldehyde and therefore it is best to utilize various forms of polymerized formaldehyde because of this difficulty. The product, furthermore, has the objection that its keeping qualities are very limited as it will at ordinary room temperature be converted to its final infusible form.

It is to be understood that various lubricants and modifying agents of a liquid, solid or semi-solid nature may be added before, during or after the reaction and that various coloring materials such as dyes and pigments may be added at any suitable time. Wherein I have called for the use of formaldehyde solutions, it is to be understood that these can be replaced by its polymers, or, for that matter, any products having active methylene groups in condition to combine with the resorcin.

What I claim is—

1. The herein described process of making a solid, potentially reactive composition comprising heating resorcin with less than a molecular proportion of an active methylene body to a temperature at which an exothermic reaction occurs and then, after the initial exothermic reaction has subsided, further heating the product until a hard but still fusible, resinous reaction product is secured and adding thereto a further quantity of an active methylene body to act as a hardening agent for said resinous reaction product.

2. The herein described process of making a solid, potentially reactive composition comprising heating resorcin with less than a molecular proportion of formaldehyde to a temperature at which an exothermic reaction occurs and then after the initial exothermic reaction has subsided further heating the product until a hard but still fusible resinous reaction product is secured and adding thereto a further quantity of an active methylene body to act as a hardening agent for said resinous reaction product.

3. A fusible solid resinous reaction product of recorcin and less than a molecular proportion of an active methylene body and having a hardening agent added thereto to convert said fusible resinous product to its hard, set and infusible form.

4. A fusible solid resinous reaction product of resorcin and less than a molecular proportion of an active methylene body, and having paraformaldehyde added thereto as a hardening agent for the fusible resin, whereby said resinous product may be converted to its hard, set and infusible form.

5. In the art of resin making, a method for controlling the reaction of resorcin and formaldehyde whereby the water of solution and of reaction may be removed without the resin going to an infusible state comprising reacting less than a molecular proportion of formaldehyde with the resorcin, then heating to remove the water of solution and reaction and finally adding a sufficient amount of an active methylene body to cause the initial reaction product to be capable of going to an infusible state when heated.

6. In the art of resin making, a process of making a dry, solid, fusible and potentially reactive resinous reaction product of resorcin and an active methylene body, which product is capable of being stored at ordinary atmospheric temperatures over relatively long periods of time without becoming infusible comprising reacting resorcin with less than a molecular proportion of formaldehyde, then heating to remove the water of solution and reaction and finally adding a sufficient amount of an active methylene body to cause the initial reaction product to be capable of going to an infusible state when heated.

7. A solid fusible resinous product formed by the reaction of resorcin and formaldehyde in the absence of a catalyst, said resinous product being capable of remaining fusible over long periods of time at ordinary atmospheric temperatures and of becoming infusible under the action of heat.

8. A solid fusible resinous product formed by the reaction of resorcin and formaldehyde at temperatures between 212° and 310° F. in the absence of a catalyst.

9. A moldable composition comprising a solid fusible resinous reaction product of resorcin and formaldehyde formed in the absence of a catalyst, an active methylene body and a suitable filling material, said composition being capable of taking on a hard set and infusible form under the action of heat.

10. A potentially reactive solid fusible but insoluble resinous reaction product resulting from the reaction of 50 parts by weight of resorcin and the equivalent of from 28 to 33 parts by weight of a 37% aqueous solution of formaldehyde when heated to a temperature at which an exothermic reaction takes place.

11. A solid fusible resinous product formed by the reaction of 50 parts by weight of resorcin and not over the equivalent of 28 parts by weight of a 37% aqueous solution of formaldehyde when heated to a temperature at which an exothermic reaction begins, and then after the initial reaction has subsided heating to higher temperatures to drive off the water of solution and recation and to convert the reaction product to hard grindable but fusible resin substantially free from water.

12. The herein described process of making a solid resinous reaction product of resorcin and formaldehyde comprising heating resorcin with less than a molecular proportion of formaldehyde in the absence of a catalytic agent to a temperature at which an exothermic reaction occurs and then after the initial exothermic reaction has subsided further heating the product until a hard and grindable but still fusible resinous reaction product is secured.

13. The herein described process of making a solid resinous reaction product of resorcin and formaldehyde comprising heating resorcin with less than a molecular proportion of formaldehyde in the absence of a catalyst to a temperature at which an exothermic reaction occurs and then after the initial exothermic reaction has subsided further heating the product until substantially all of the water of reaction and solution has been driven off and a hard and grindable but still fusible resinous reaction product is secured.

14. The herein described process of making a solid resinous reaction product of resorcin and formaldehyde comprising heating proportions of ten mols. of resorcin with from six to ten mols. of formaldehyde to a temperature at which an exothermic reaction occurs whereby a solid insoluble but fusible and potentially reactive resin is formed without the aid of a catalyst.

15. The herein described process of making a solid resinous reaction product of resorcin and formaldehyde comprising heating proportions of 50 parts by weight of resorcin and the equivalent of 33 parts by weight of a 37% aqueous solution of formaldehyde to to temperature of 220° F. until a solid insoluble but fusible and potentially reactive resin is formed without the aid of a catalyst.

16. The herein described process of making a solid resinous reaction product of resorcin and formaldehyde comprising heating proportions of 50 parts by weight of resorcin with the equivalent of not over 28 parts by weight of a 37% aqueous solution of formaldehyde to a temperature above 250° F. until a hard grindable fusible resin is formed which is stable at ordinary atmospheric temperatures.

17. The herein described process of making a solid resinous reaction product of resorcin and formaldehyde comprising heating proportions of 50 parts by weight of resorcin with the equivalent of not over 28 parts by weight of a 37% aqueous solution of formaldehyde to a temperature above 250° F. until a hard grindable fusible resin is formed which is stable at ordinary atmospheric temperatures and substantially free from water.

18. The herein described method for making a moldable composition comprising heating proportions of 50 parts by weight of resorcin with the equivalent of not over 28 parts by weight of a 37% aqueous solution of formaldehyde to a temperature above 250° F. until a hard resinous reaction product is formed, removing the water of reaction and of solution therefrom, and adding thereto an active methylene body and suitable filling materials whereby a product is obtained which is capable of taking on a hard set and infusible form under the reaction of heat.

Signed at Philadelphia in the county of Philadelphia and State of Pennsylvania this 19th day of August, A. D. 1926.

EMIL E. NOVOTNY.